US012020575B2

(12) United States Patent
Thakur

(10) Patent No.: US 12,020,575 B2
(45) Date of Patent: Jun. 25, 2024

(54) AUTONOMOUS VEHICLE FLEET MANAGEMENT SYSTEM BASED ON APPLICATION STATUS

(71) Applicant: GM Cruise Holdings LLC, San Francisco, CA (US)

(72) Inventor: Divya Thakur, San Francisco, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 0 days.

(21) Appl. No.: 17/839,580

(22) Filed: Jun. 14, 2022

(65) Prior Publication Data

US 2022/0309927 A1    Sep. 29, 2022

Related U.S. Application Data

(63) Continuation of application No. 16/370,717, filed on Mar. 29, 2019, now Pat. No. 11,386,791.

(51) Int. Cl.
| | | |
|---|---|---|
| *G08G 1/00* | (2006.01) | |
| *G01C 21/34* | (2006.01) | |
| *G05D 1/00* | (2006.01) | |
| *G06Q 10/02* | (2012.01) | |
| *G06Q 50/40* | (2024.01) | |

(52) U.S. Cl.
CPC ......... *G08G 1/202* (2013.01); *G01C 21/3438* (2013.01); *G05D 1/0088* (2013.01); *G05D 1/0297* (2013.01); *G06Q 10/02* (2013.01); *G06Q 50/40* (2024.01)

(58) Field of Classification Search
CPC ........................... G01C 21/3438; G06Q 50/30
See application file for complete search history.

(56) References Cited

U.S. PATENT DOCUMENTS

| | | |
|---|---|---|
| 2011/0225269 A1 | 9/2011 | Yap et al. |
| 2012/0265433 A1 | 10/2012 | Mola et al. |
| 2013/0246207 A1 | 9/2013 | Novak et al. |
| 2013/0262222 A1 | 10/2013 | Gibson et al. |
| 2014/0059144 A1 | 2/2014 | Lehmann et al. |
| 2014/0278291 A1 | 9/2014 | Zheng et al. |
| 2015/0161643 A1 | 6/2015 | Randell et al. |
| 2015/0262430 A1 | 9/2015 | Farrelly et al. |
| 2015/0347499 A1 | 12/2015 | Keen et al. |
| 2016/0034845 A1 | 2/2016 | Hiyama et al. |
| 2016/0209220 A1 | 7/2016 | Laetz |
| 2016/0247247 A1 | 8/2016 | Scicluna |
| 2016/0321116 A1 | 11/2016 | Schwartz, Jr. et al. |
| 2016/0364657 A1 | 12/2016 | Bryant et al. |
| 2016/0364678 A1 | 12/2016 | Cao |

(Continued)

*Primary Examiner* — Jess Whittington

(57) ABSTRACT

Systems and methods provide for optimizing dispatching of autonomous vehicles (AVs) using an AV fleet management system. The AV fleet management system can receive first data indicative of client application to the AV fleet management system being opened on a client device. The AV fleet management system can determine availability of an AV within proximity of the client device. The AV fleet management system can determine a first route from a first location of the AV to a second location of the client device. The AV fleet management system can dispatch the AV from the first location to the second location via the first route prior to determining a destination of a second route from the second location to the destination.

15 Claims, 9 Drawing Sheets

(56) References Cited

U.S. PATENT DOCUMENTS

| | | |
|---|---|---|
| 2016/0364823 A1 | 12/2016 | Cao |
| 2016/0364824 A1 | 12/2016 | Bryant et al. |
| 2017/0069214 A1 | 3/2017 | Dupray et al. |
| 2017/0103172 A1 | 4/2017 | Fink et al. |
| 2017/0186126 A1* | 6/2017 | Marco ................ G01C 21/3438 |
| 2017/0234687 A1 | 8/2017 | Tseng et al. |
| 2018/0173403 A1* | 6/2018 | Carbune ................ G06Q 50/12 |
| 2021/0334353 A1 | 10/2021 | Peng et al. |
| 2022/0015140 A1 | 1/2022 | Vannithamby et al. |

* cited by examiner

AUTONOMOUS VEHICLE FLEET MANAGEMENT SYSTEM BASED ON APPLICATION STATUS

CROSS-REFERENCE TO RELATED APPLICATIONS

This application is a continuation and claims the benefit of U.S. application Ser. No. 16/370,717, filed on Mar. 29, 2019, which is expressly incorporated by reference herein in its entirety.

TECHNICAL FIELD

The subject matter of this disclosure relates in general to the field of autonomous vehicles, and more particularly, to optimizing dispatching of autonomous vehicles using an autonomous vehicle fleet management system.

BACKGROUND

An Autonomous Vehicle (AV) is a motorized vehicle that can navigate without a human driver. The AV can include a plurality of sensor systems, such as a camera sensor system, a Light Detection and Ranging (LIDAR) sensor system, and a Radio Detection and Ranging (RADAR) sensor system, among others. The AV may operate based upon sensor signals output by the sensor systems. For example, the sensor signals can be provided to an internal computing system in communication with the plurality of sensor systems and a processor can execute instructions based upon the sensor signals to control a mechanical system of the AV, such as a vehicle propulsion system, a braking system, a steering system, and so forth.

AVs, as implemented or designed today, are essentially independent entities. Based on input from vehicle passengers, the vehicles travel a set route and typically avoid communication with other AVs. At a local level—that is, how vehicles interact with their immediate surroundings—this may be acceptable; however, at a more regional level (e.g., how vehicles decide a route to travel upon), this leaves much to be desired. AVs that can communicate with each other and other sources, as well as be controlled at a fleet level, can better respond to a greater variety of routing goals and produce substantially more coordinated and/or effective routes than any existing system. AV fleet management can also provide new and improved user experiences and services previously not possible or not thought of until the maturation of AV technology. Thus, there is a need in the field of autonomous vehicles for an AV fleet management system capable of supporting new user interaction models to better leverage the advantages and efficiencies offered by an AV fleet.

BRIEF DESCRIPTION OF THE FIGURES

To provide a more complete understanding of the present disclosure and features and advantages thereof, reference is made to the following description, taken in conjunction with the accompanying drawings, in which.

DETAILED DESCRIPTION

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

A rideshare or delivery application (also sometimes referred to as a Transportation Network Company (TNC) application, Mobility Service Provider (MSP) application, ride-hailing application, etc.) can provide a service that matches passengers or customers with drivers via websites and mobile applications or "apps." Current methods to request, cancel, and finish trips of a web-based or app-based rideshare or delivery service are click or tap-oriented processes. These interactions are necessary because of the involvement of humans in coordinating the passengers or customers and drivers. For example, the cognitive load of canceling a trip is largely due to human driver overhead in current rideshare systems. Various embodiments of the present disclosure can improve upon the prior art by configuring an Autonomous Vehicle (AV) fleet management system to support new user interaction models. In particular, systems and methods can be provided for optimizing dispatching of AVs. The AV fleet management system can receive first data indicative of client application to the AV fleet management system being opened on a client device. The AV fleet management system can determine availability of an AV within proximity of the client device. The AV fleet management system can determine a first route from a first location of the AV to a second location of the client device. The AV fleet management system can dispatch the AV from the first location to the second location via the first route prior to determining a destination of a second route from the second location to the destination. In some embodiments, the AV fleet management system may receive second data indicative of the client application being executed in the background. In response, the AV fleet management system may deprioritize dispatch of the AV to the client device. In some embodiments, the AV fleet management system may receive third data indicative of the client application being closed prior to the AV arriving at the second location of the client device. In response, the AV fleet management system may cancel the first route.

Figure 1:
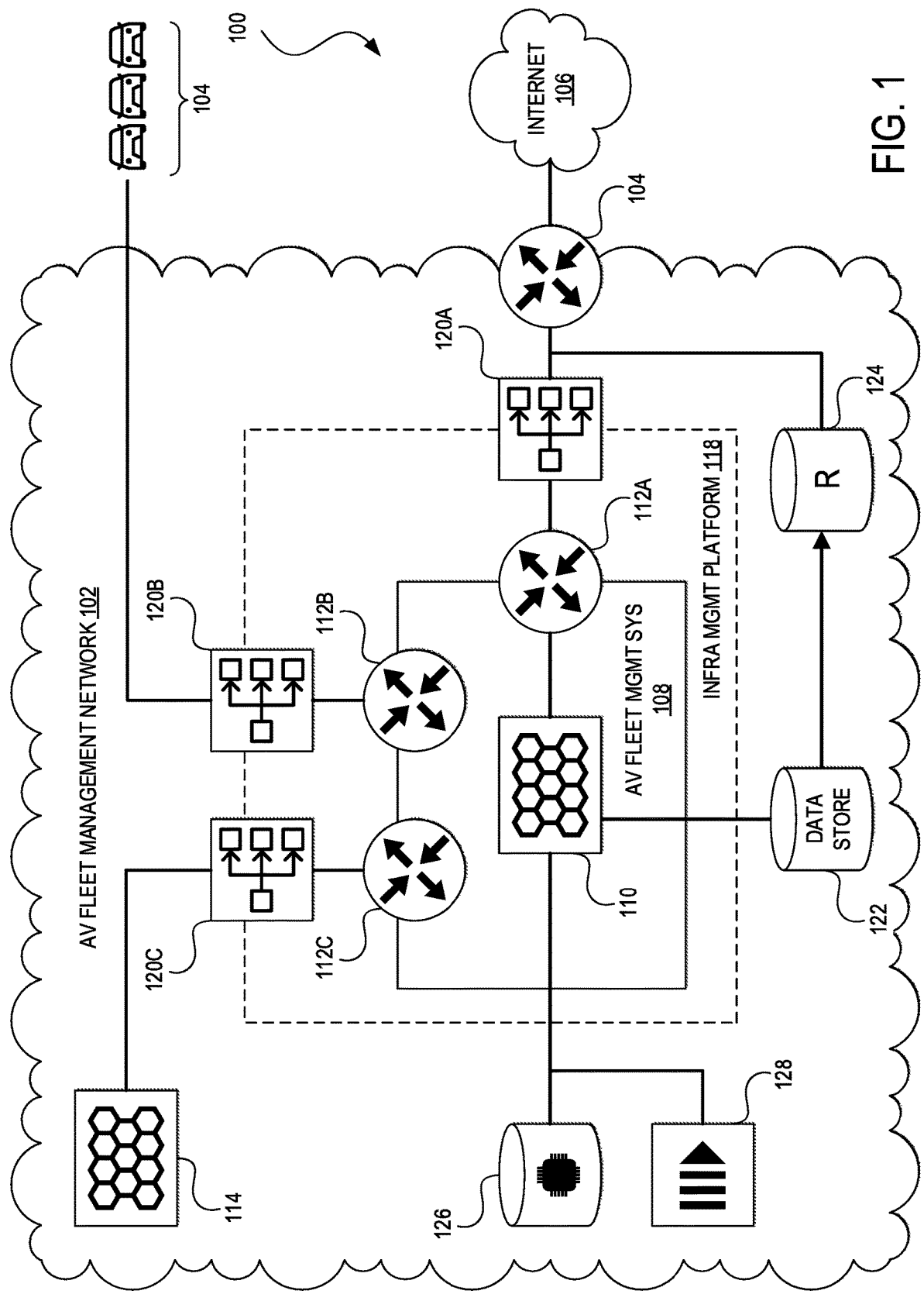
FIG. 1 illustrates a block diagram representing an example of a network environment for an autonomous vehicle (AV) fleet management system in accordance with an embodiment.

FIG. 1 illustrates a block diagram of an example of a network environment 100. One of ordinary skill in the art will understand that, for the network environment 100 and any system discussed in the present disclosure, there can be additional or fewer component in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure.

The network environment can include an autonomous vehicle (AV) fleet management network 102, an AV fleet 104, and a wide area network (WAN) 106 (e.g., the Internet). In some embodiments, the AV fleet management network 102 may reside in a public cloud. In other embodiments, the AV fleet management network 102 may reside in a private data center or co-location center. In still other embodiments, some portions of the AV fleet management network 102 may reside in one or more public clouds and some portions of the AV fleet management network 102 may reside in a private data center or co-location center in a hybrid cloud or multi-cloud configuration.

The AV fleet management network 102 can include an AV fleet management system 108. At a high level, the AV fleet management system 108 can communicate with AVs of the AV fleet 104 and handle live telemetry data coming back from the AVs in real time. The AV fleet management system 108 can also serve as a back-end for a mission control dashboard and fleet management interface. In this example, the AV fleet management system 108 can be implemented utilizing a microservices-based architecture that comprises multiple microservices 110. For instance, the microservices 110 can include a rideshare (or item delivery) service for setting directions for each AV and matching AVs with rideshare passengers (or item delivery). The microservices 110 can also include an interface for AVs to transmit and receive data to facilitate autonomous driving. Although the AV fleet management system 108 implements a microservices architecture in this example, other elements of the AV fleet management network 102 and/or other embodiments of the AV fleet management system 108 may alternatively or additionally utilize other software architectures or patterns, such as a multi-layer or multi-tier architecture (e.g., presentation tier, application tier, and data tier), a microkernel architecture (e.g., an application with a core set of responsibilities and a collection of interchangeable parts or plug-ins), an event-driven or broker architecture (e.g., a central unit that accepts all data and then delegates it to separate modules that handle a particular type of data), a space-based architecture (e.g., application comprising a set of self-sufficient, independent units that can scale by adding additional units), or other suitable enterprise application architecture.

The AV fleet management system 108 can also include a number of gateways for communication with other elements of the AV fleet management network 102 and the outside world, such as a public gateway 112A, a vehicle gateway 112B, and a support gateway 112C (collectively, 112). In some embodiments, each gateway 112 can be associated with one or more websocket servers (not shown) for full-duplex, real-time communications over a persistent connection and web servers for providing a set of Restful State Transfer (REST) endpoints using Hypertext Transfer Protocol (HTTP) (not shown) for less frequent, unidirectional communications and stateless operations over a short-lived connection. REST is a design pattern in which a server enables a client to access and interact with resources via Uniform Resource Identifiers (URIs) using a set of pre-defined stateless operations (referred to as endpoints). Each gateway 112 may also be associated with an Authentication, Authorization, and Accounting (AAA) server (e.g., OAuth 2.0, custom token-based authentication, etc.) (not shown).

The public gateway 112A can be open to requests over the WAN 106 from client devices (e.g., desktop computers, laptops, tablets, mobile phones, wearable devices, etc.) executing client applications (e.g., mobile application or "app", voice assistant, Short Message Service (SMS) or other text messaging application, a web application accessed via a browser, etc.) for hailing an AV for a rideshare (or item delivery) service. The vehicle gateway 112B can be an internal gateway for handling communications between the AV fleet management system 108 and the vehicles of the AV fleet 104. In some embodiments, the vehicle gateway 112B may be associated with multiple websockets, such as a main websocket for communicating with each AV and an additional websocket for configuration of the AVs. The support gateway 112C can be an internal gateway for inter-service communications between the AV fleet management system 108 and other internal services, modules, components, or subsystems, such as an AV training system, an issue tracking system, a collaboration system, and so forth.

In this example, the microservices 110 and 114 may be deployed using an infrastructure management platform 118. The infrastructure management platform 118 can be used to provision the microservices 110 and 114 within container clusters across multiple regions, on multiple cloud providers. The infrastructure management platform 118 can also provide centralized authentication and access control and perform other administrative tasks, such as upgrades, monitoring, and capacity management. The infrastructure management platform 118 can interface with various container clustering systems or orchestrators. These container orchestration platforms can automate deployment, scaling, and management of containers across clusters of hosts, including discovering, interconnecting, and load balancing containers, such as via load balancers 120A, 120B, and 120C (collectively, 120) associated with public gateway 112A, the vehicle gateway 112B, and the support gateway 112C, respectively.

In some embodiments, the AV fleet management network 102 can operate as a "big data" system capable of handling large volumes of data (e.g., terabytes or petabytes of data), receiving and transmitting data at high velocities (e.g., near real-time or real-time), and processing a large variety of data, such as data having different structure (e.g., structured, semi-structured, unstructured, etc.), data of different types (e.g., text, audio, video, etc.), data associated with different data stores (e.g., relational databases, key-value stores, document databases, graph databases, column-family databases, data analytic stores, search engine databases, time series databases, object store, file systems, etc.), data originating from different sources (e.g., AVs, enterprise systems, social networks, etc.), data having different rates of change (e.g., batch, streaming, etc.), or data having other heterogeneous characteristics.

The AV fleet management network 102 can collect, process, and store data from heterogeneous data sources using a distributive processing framework, such as a massive parallel processing (MPP) framework, the Apache Hadoop® and MapReduce framework, or the Apache Spark™ framework, among others. The AV fleet management network 102 can integrate data from the heterogeneous data sources to provide access to all of the integrated data and to support different modes of access, such as by deploying a hybrid data architecture including an enterprise data warehouse (EDW) and a data lake, a data virtualization architecture, or other multi-model data architecture. The AV fleet management network 102 can provide optimized views (e.g., data marts, operational data stores, analytic sandboxes, etc.) into the integrated data to support the microservices 110 and 114.

In this example, the AV fleet management network 102 can include a data store 122 (e.g., EDW, data lake, Relational Database System (RDS), etc.) and one or more read replicas 124 for facilitating REST-like data transactions and an in-memory key-value database 126 and a streaming message system 128 (e.g., Neural Autonomic Transport System (NATS), Message Queuing Telemetry Transport (MQTT), etc.) for handling real-time data transactions.

Figure 2:
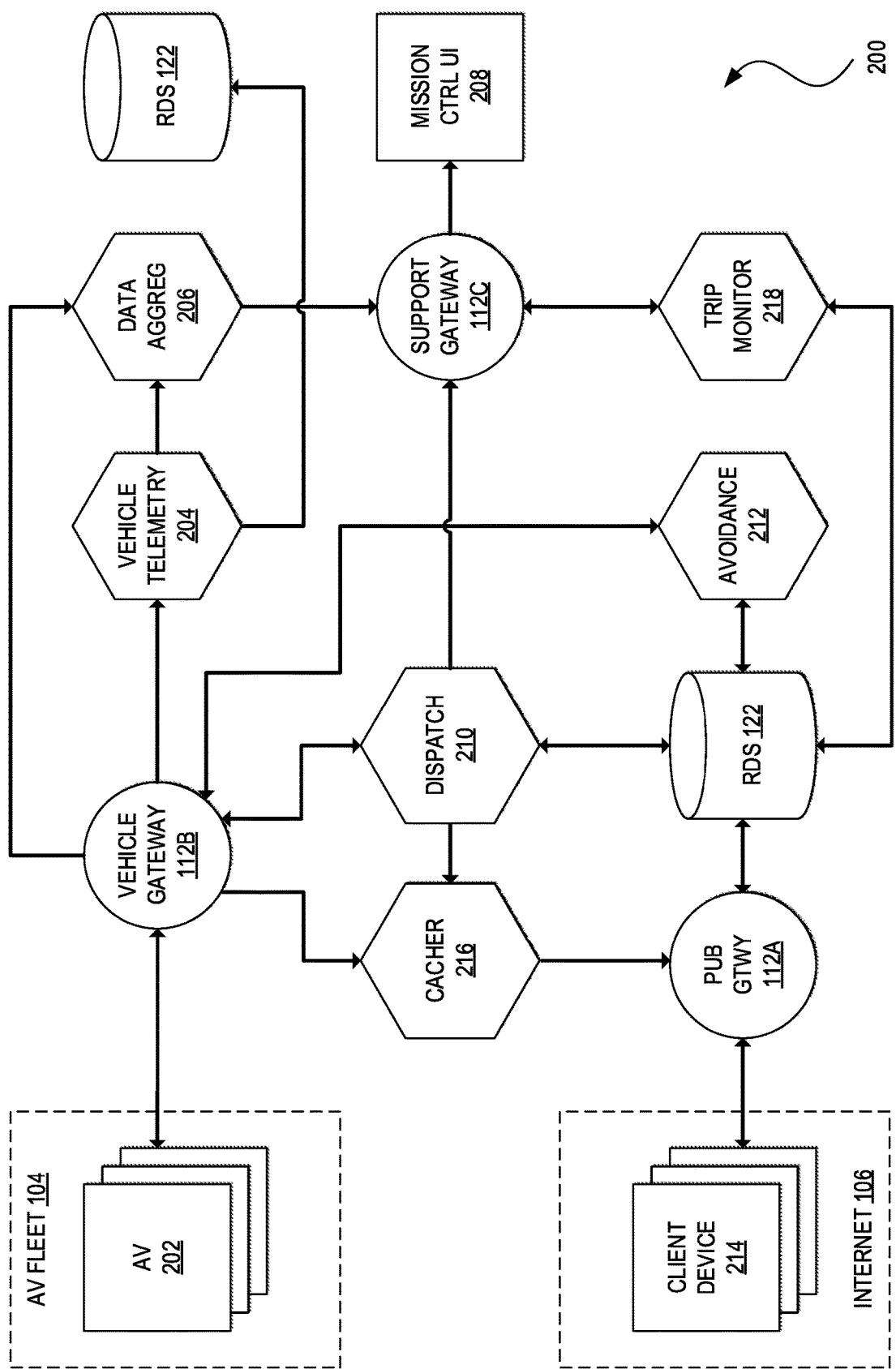
FIG. 2 illustrates a data flow diagram representing examples of data flows of an AV fleet management system in accordance with an embodiment.

FIG. 2 illustrates a data flow diagram 200 of examples of data flows of an AV fleet management system, such as the AV fleet management system 108. These data flows can include telemetry flows, Remote Procedure Call (RPC) flows, and the like. The telemetry flows can comprise data from AVs 202 of the AV fleet 104 to different parts of the AV fleet management system, such as an AV rideshare (or item delivery) service. The telemetry flows can include lightweight real-time positioning data of AVs, system state data (e.g., an AV's system state, recent state transitions history, safe stop diagnostics, etc.), passenger state data (e.g., current destination metadata, route, etc.), and rideshare (or item delivery) service state data. The telemetry flows can be received by the vehicle gateway 112B, and then routed to a vehicle telemetry service 204. The vehicle telemetry service 204 can process the telemetry flows for retention in the data store 122. In addition, the vehicle telemetry service 204 can calculate vehicle poses (e.g., positions and orientations) and transmit them to a data aggregator service 206. The data aggregator service 206 can aggregate the vehicle data for the AV fleet 104 and provide the data to a mission control dashboard and fleet management interface 208 via the support gateway 112C.

The RPC data flows can comprise bidirectional directions between the AVs 202 and various backend services of the AV fleet management system. The RPC flows can correspond to certain RPC services of the AV fleet management system, such as a vehicle service (not shown), a dispatch service 210, an avoidance area service 212, an image data service (not shown), and a video service (not shown), among others. The vehicle service can run on each AV 202 and can be responsible for receiving new waypoints and communicating them to a planning stack of the AV. The dispatch service 210 can run within an AV fleet management network (e.g., the AV fleet management network 102) and can be responsible for handling waypoint status changes received from each AV 202 and sending new directions back to the AV. The avoidance area service 212 can run on each AV 202 and can be responsible for receiving new avoidance areas and communicating them to the planning stack of the AV as well as other AVs of the AV fleet 104. The image data service can run in the AV fleet management network and can be responsible for handling live image data around important events received from each AV 202. The video RPC service can run on each AV 202 and can be responsible for turning on and off live video streaming.

In general, the AV rideshare (or item delivery) service is a dispatching system and user-to-vehicle matching solution designed to provide ridesharing (or item delivery) on top of a fleet of AVs. Users of client devices 214 may interact with the AV rideshare (or item delivery) service through client applications connected to the public gateway 112A over the WAN 106. In this example, several services, modules, components, or subsystems of the AV fleet management system can contribute to the AV rideshare (or item delivery) service, such as the dispatch service 210, a cacher service 216, a trip monitor service 218, the public gateway 112A, and the support gateway 112C.

Figure 3:
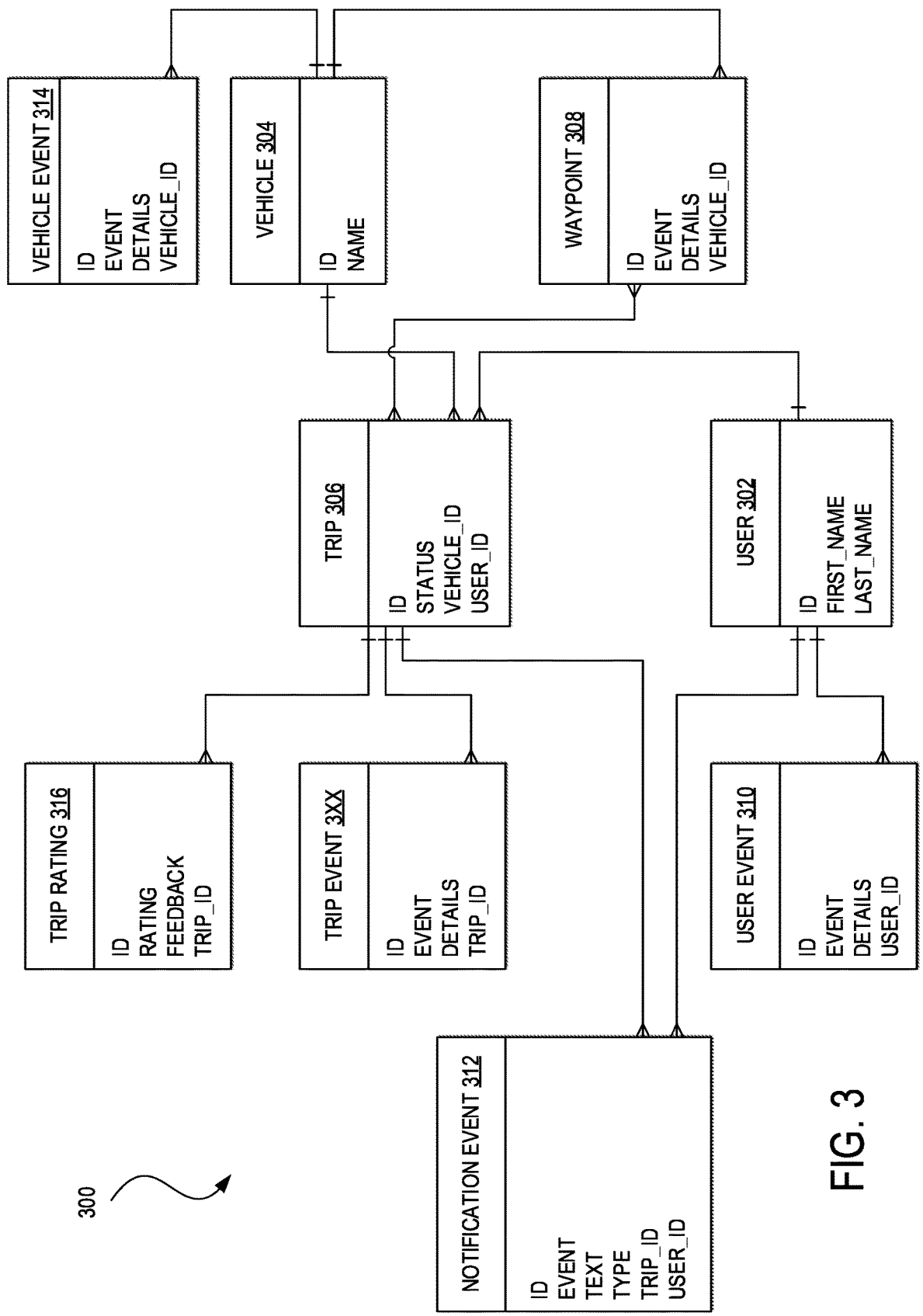
FIG. 3 illustrates a Unified Modeling Language (UML) diagram representing an example of a data model for an AV fleet management system in accordance with an embodiment.

FIG. 3 illustrates a UML diagram of an example of a data model 300 for the AV rideshare (or item delivery) service. The data model 300 can include representations of a user 302, a vehicle 304, a trip 306, and a waypoint 308, and other metadata associated with these entities. The user 302 can represent a passenger (e.g., a person who requests to be driven from one point to another) or delivery customer (e.g., a person who requests delivery of a physical item from one point to another). The vehicle 304 can represent an AV capable of driving the user 302 or a physical item (not shown) from one place to another. The trips 306 can represent an event of driving through the city with the user 302 or physical item inside the vehicle 304. The waypoint 308 can represent a set of coordinates serving as directions for the vehicle 304. The waypoint 308 can be part of one or more of the trips 306.

Each user may be associated with zero or more user events 310 (e.g., on-boarding, authentication, payments, etc.) and notification events 312 (e.g., requests for trips, updated trips, canceled trips, etc.). Each vehicle 304 may be associated with one or more vehicle events 314 (e.g., refuels or recharges, maintenance schedule, traffic incidents, etc.). Each trip may be associated with zero or more notification events 312 (e.g., estimated times of arrival, updated trips, traffic incidents, etc.), trip ratings 316 (e.g., an indication of a user's satisfaction with the AV rideshare (or item delivery) service), and trip events 318 (e.g., Pickups, Dropoffs, congestion, traffic incidents, etc.).

Returning to FIG. 2, the dispatch service 210 can be responsible for handling waypoint status changes received from each AV and sending new waypoint directions back to the vehicles. The dispatch service 210 can have two data input types, RPC requests initiated by AVs and real-time vehicle state (e.g., rideshare (or item delivery) service state, telemetry, etc.) streaming from the AVs. When the dispatch service 210 detects discrepancies between an AV's waypoint queue in the data store 122 and a waypoint queue reported by the AV in the AV rideshare (or item delivery) service state, the dispatch service 210 can send a "ReplaceWaypoint" RPC request to that AV with the most recent version of the waypoint queue.

The dispatch service 210 can also process certain waypoint state transitions for each AV 202, such as set forth in Table 1 below.

TABLE 1

Example of Waypoint State Transitions Processed by the Dispatch Service 210

| AV STATE | DISPATCH SERVICE ACTION |
| --- | --- |
| AV has no waypoints | Assign a random waypoint |
| AV has almost arrived at a random waypoint | Cancel current waypoint and assign another random waypoint |
| AV arrived at a pick-up or drop-off waypoint | Change waypoint state to "Waiting" |
| AV sent "Advance" RPC for pick-up waypoint which is in the | Change Pickup waypoint state to "Done" and Dropoff Waypoint state |

TABLE 1-continued

Example of Waypoint State Transitions
Processed by the Dispatch Service 210

| AV STATE | DISPATCH SERVICE ACTION |
|---|---|
| "Waiting" state | to "Active" |
| AV sent "Cancel" RPC for Pickup or Dropoff Waypoint | Change Pickup, Dropoff, and Trip states to "Canceled"; Assign a random waypoint |

In some embodiments, the dispatch service 210 can also be responsible for handling instances when an AV is in an idle state, such as by engaging the idle AV in mapping exploration and validation, supply and demand-based positioning, and so forth. For example, when an AV gets into any of the states listed in Table 1 where the AV needs a random waypoint, the dispatch service 210 can determine a random waypoint to send to the vehicle using one of these approaches.

Mapping exploration and validation can leverage idle AVs to map new regions and/or validate mapped regions. For example, when a new region becomes available to the AV fleet management system, the dispatch service 210 can assign an idle AV to that region and ensure that the AV only receives random points within that region in order to stay in that region.

Alternatively or in addition, the dispatch service 210 can utilize a simple supply/demand model of a city to pick a random waypoint. A city can be broken down into neighborhoods according to a predicted demand. The demand model can be kept in a shared state and may only be set for neighborhoods which have a sufficient portion (e.g., at least 25%) of their area within the routable area. When the dispatch service 210 receives a request to assign a random waypoint, the dispatch service can compare the supply of available AVs to the demand models for the neighborhoods. For example, the AV fleet management system can determine the most underserved neighborhood as the neighborhood comparing en route supply to its predicted demand. Once a neighborhood is determined to be the most underserved, a randomly selected waypoint within the routable area of that neighborhood can be added to the vehicle's waypoint queue.

The cacher service 216 is a service responsible for caching data related to a particular trip that can later be transferred to a trip passenger in a periodic manner. Some of the functionality of the cacher service 216 can include parsing of incoming AV state (e.g., telemetry state, passenger state, dispatch service state messages, etc.), listening to published trip updates, calculating an Estimated Time of Arrival (ETA) for active trips, caching aggregated state information, and periodically refreshing cached trip/waypoint states in accordance with the data store 122.

The trip monitor service 218 can be implemented as a periodic job (e.g., running every 30 minutes) that may cancel trips that were never properly finished by the AV rideshare (or item delivery) service or its users. The trip monitor service 218 can also create "trip exceptions" for pullovers that take too long and slow times to get to Pickup waypoints. A trip may be canceled if the trip has at least one waypoint not in a "Pending," "Active," or "Waiting" state, a first predetermined period of time (e.g., 30 minutes) has elapsed since the last trip event, or a second predetermined period of time (e.g., 5 minutes) has elapsed since the AV last reported telemetry.

The support gateway 112C can be open to requests to the mission control dashboard and fleet management interface 208. The users of the mission control dashboard and fleet management interface 208 can query trips, users, and vehicles participating in the AV rideshare (or item delivery) service. Administrators of the AV rideshare (or item delivery) service can also cancel or advance waypoints to deal with anomalies or unexpected road situations preventing regular trip flow.

The public gateway 112A can provide a set of API endpoints dedicated to the AV rideshare (or item delivery) service. For example, the API endpoints can enable the client devices 214 to be authenticated, authorized, and accounted for the service, request a trip from one point to another, cancel a trip, rate a finished trip, query a trip history, receive push notifications regarding trip status updates, receive real-time positions of AVs available around them or assigned to a trip, receive a preview of a route from pickup to dropoff, receive the ETA of a nearest AV, and so forth.

Figure 4A:
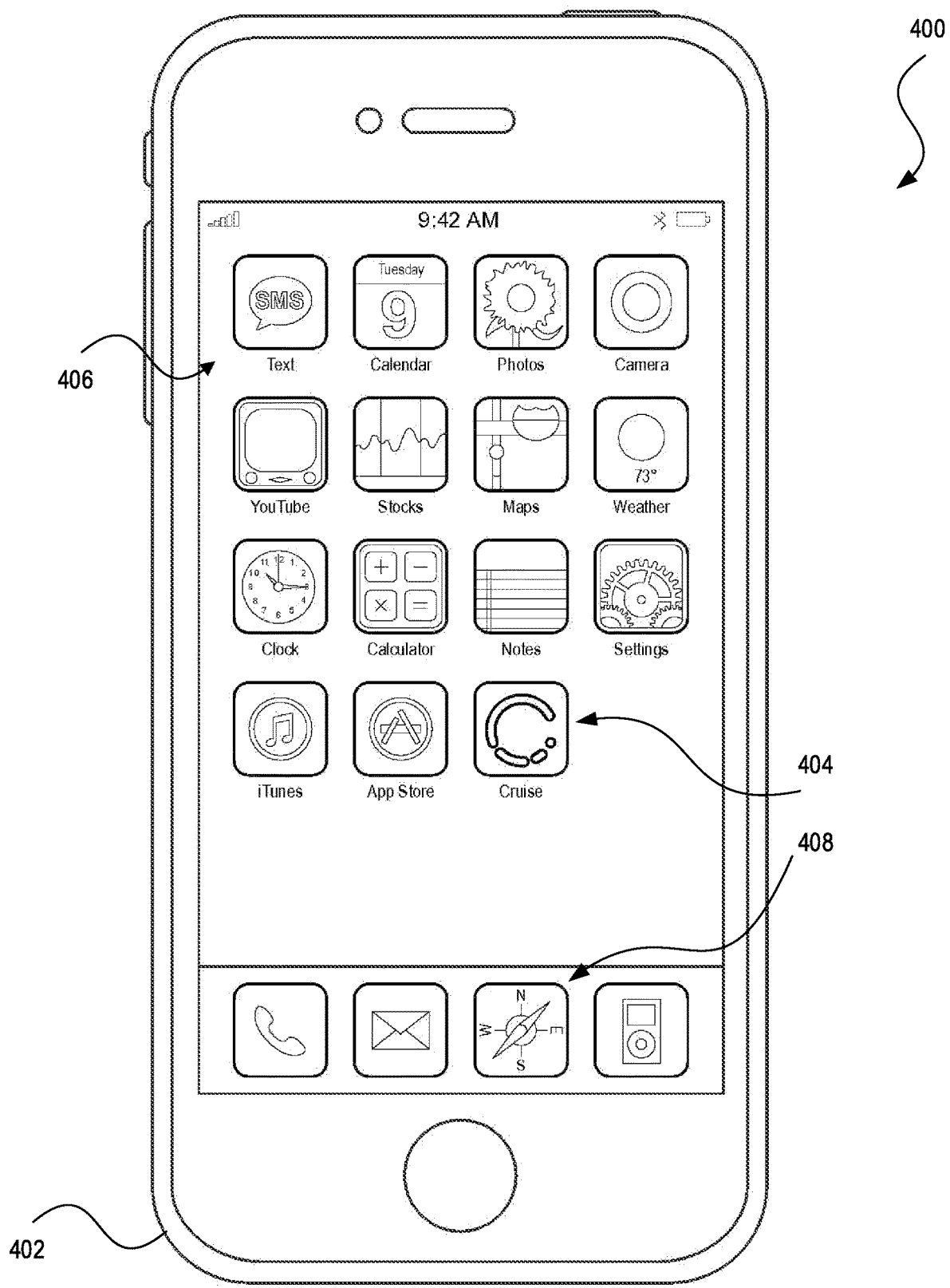
FIGS. 4A-4C illustrate examples of user interfaces for a client application of an AV fleet management system in accordance with an embodiment.
Figure 4B:
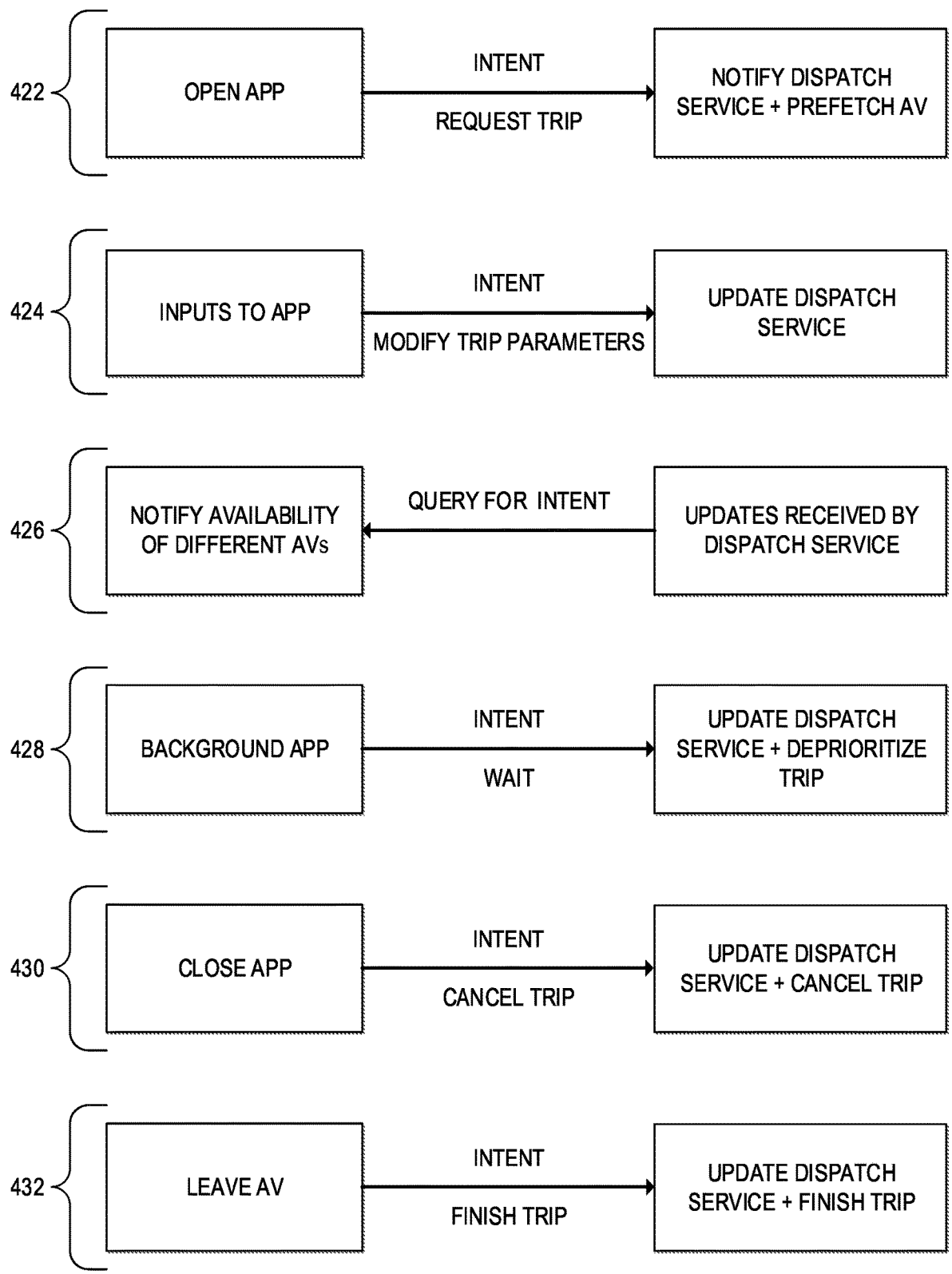
Figure 4C:
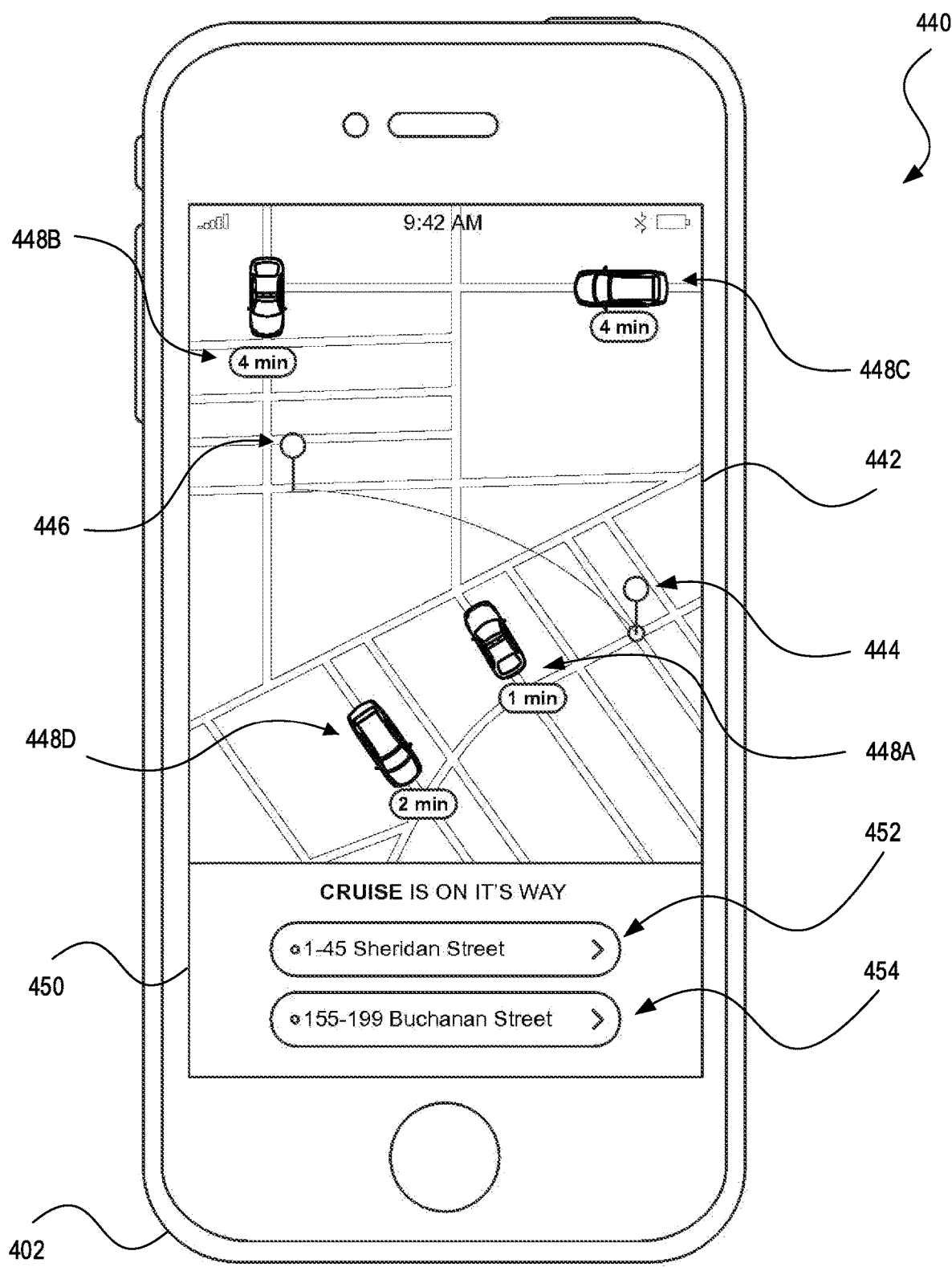

FIGS. 4A-4C illustrate examples of user interfaces for a client application to an AV fleet management system. Although FIGS. 4A-4C show user interfaces of a mobile application or app executing on a smart phone, the principles disclosed in the present disclosure are widely applicable to client devices of other form factors, including large form-factor general purpose computing devices (e.g., servers, workstations, desktops, laptops, etc.), other small form-form factor general purpose computing devices (e.g., tablets, smart watch, smart glasses, other wearable devices, etc.), smart speakers, televisions, set top boxes, and other electronic devices capable of connecting to a network and including input/output components to enable a user to interact with the AV fleet management system. Other embodiments may also be implemented as a web application that can be accessed through a web browser or integrated as a user interface element of another client application (e.g., app actions, shortcuts, widgets, plug-ins, webpage action buttons, etc.). One of ordinary skill will also understand that the user interfaces of FIGS. 4A-4C are but one example of possible user interfaces of a client application to an AV fleet management system. Other embodiments may include a fewer number or a greater number of elements.

FIG. 4A illustrates a graphical user interface 400, which is an example of a home screen of a mobile computing device 402. The graphical user interface 400 can comprise a plurality of user interface elements or app icons, that upon selection, opens an application corresponding to the selected user interface element or app icon. In this example, the graphical user interface 400 includes an app icon 404 for a rideshare or deliver service, an app icon 406 for an SMS app, and an app icon 408 for a web browser. Ordinarily, selection of an app icon opens the corresponding app and requires additional user input for any action to be taken. For example, conventional rideshare apps require a user to input a destination and click on a confirmation button before a vehicle is dispatched to the user. Various embodiments of the present disclosure can improve upon conventional approaches by using a different interaction model.

FIG. 4B illustrates an example of an aggregate user interaction model 420 of a client application for requesting dispatch of an AV for a rideshare or delivery service. The aggregate user interaction model 420 can include user interaction models 422, 424, 426, 428, 430, and 432. The user interaction model 422 can represent user intent to request for a trip from the AV rideshare or delivery service. A user can express by this user intent by opening a client application or app to an AV fleet management system. The client application can be a standalone application or app, a web application accessible via a web browser, or other client software (e.g., app action or shortcut, widget, plug-in, etc.) for generating an event to the AV fleet management system. In response to the user action, the AV fleet management system can prefetch an AV for the user (e.g., initiate a dispatch process for determinability the availability of the AV and routing the AV to the user prior to receiving the destination for the trip).

The user interaction model 424 can represent user intent to modify parameters of the trip. For example, the user may wish to change or update a pickup location, dropoff location, AV, and so forth, as discussed in further detail below.

The user interaction model 426 can represent the AV rideshare (or item delivery) service querying user intent upon the state of the AV fleet changing. For example, the AV rideshare (or item delivery) service may determine from time to time that it may be preferable or optimal to dispatch a newly available AV to a user. The AV rideshare (or item delivery) service may transmit a notification to the user prompting whether the user would like to be serviced by the newly available AV.

The user interaction model 428 can represent user intent to delay a trip. A user can express this intent by moving the client application to the background such that the client application is executing as a background application. In response to the user action, the AV fleet management system can update the dispatch service to determine whether the AV currently dispatched to the user would be a preferred AV or more optimal AV for a second user still waiting for his/her AV. If so, the AV rideshare (or item delivery) service may reroute the currently dispatched AV to the second user and dispatch a different AV for the first user.

The user interaction model 430 can represent user intent to cancel a trip. A user can express this intent by closing the client application. In response to the user action, the AV rideshare (or item delivery) service can cancel the trip, reset the state of the AV currently dispatched to the user to make it immediately available for other users, and update the dispatch service to determine whether the AV would be a preferred AV or more optimal AV for another user still waiting for his/her AV. If so, the AV rideshare (or item delivery) service may reroute the currently dispatched AV to the second user.

The user interaction model 432 can represent user intent to finish a ride. A user can express this intent by leaving the AV at the end of a ride. In response to the user action, the AV rideshare (or item delivery) service can record that the ride has been finished, reset the state of the AV to make it immediately available for other users, and update the dispatch service to determine whether the AV would be a preferred AV or more optimal AV for another user still waiting for his/her AV. If so, the AV rideshare (or item delivery) service may reroute the currently dispatched AV to the second user.

FIG. 4C illustrates a graphical user interface 440, which is an example of a main screen of a client application of an AV rideshare (or item delivery) service, such as shown and discussed with respect to FIG. 2. The graphical user interface 440 can be displayed on a client device (e.g., the mobile computing device 402) and include a top pane 442 and a bottom pane 450. The top pane 442 can comprise a street map indicating the current location of the client device, as represented by a first locator icon 444, and a selected trip destination, as represented by a second locator icon 446. In some embodiments, the top pane 442 may exclude the second locator icon 446 when the client application is first opened and the client application may display the second locator icon 446 when a trip destination is selected as discussed further below.

The top pane 442 may also include a number of car icons 448A, 448B, 448C, and 448D (collectively, 448) each representing an available AV of the AV rideshare (or item delivery) service most proximate to the client device 402. Each of the car icons 448 also includes an ETA indicating the estimated time it would take for a corresponding AV to travel from the AV's current location to the current location represented by the first locator icon 444. The AV that is currently dispatched to the user by the AV rideshare (or item delivery) service may be represented by a car icon using graphical elements that are different from other available AVs within proximity of the client device 402, such as a car icon with bold lines (versus car icons with lines of normal thickness), a colored car icon (versus gray car icons), and so forth. In some embodiments, the client application can enable a user to select a different available AV by selecting (e.g., via a double tap or click) a car icon corresponding to that AV. For example, the user may prefer to delay pickup and select an available AV with a longer ETA. As another example, the user may prefer an AV of a different make or model due to personal proclivities or to accommodate a different number of passengers or different sizes of delivery items. As yet another example, the user may prefer an AV having different resources (e.g., amount of fuel or battery charge, sunroof, moon roof, stereo system, gaming system, air conditioning, heater, etc.) or other characteristics (e.g., mileage, age, number of traffic incidents, etc.). In some embodiments, these different attributes may be immediately indicated in the top pane 442. In other embodiments, these attributes or additional information regarding the AVs may be indicated by selection (e.g., via a single tap or click or a long press or right click) of a car icon.

The bottom pane 450 can include a first user interface element 452 indicating a location associated with the client device 402, such as the current location of the client device 402 or a designated pickup location at which a user of the client device 402 is expected to be located. The designated pickup location may be selected by the AV rideshare (or item delivery) service or the user. In some embodiments, the AV rideshare (or item delivery) service may automatically populate the first user interface element 452 with the current location of the client device 402 when the client application is first opened but the user may utilize the first user interface element 452 to update the pickup location.

The bottom pane 450 can also include a second user interface element 454 representing a trip destination. In some embodiments, the second user interface element 454 may have no value when the client application is first opened. In other embodiments, the AV rideshare (or item delivery) service may automatically populate the second user interface element 454 with a trip destination determined based on user contextual data, such as saved preferences or pickup and dropoff pairs, location data included in an appointment entry, historical behavior data specific to the user, historical behavior data of a set of users having similarities to the specific user, historical behavior data of all users, and so forth. Whether having no value or automatically populated, the user may utilize the second user interface element 454 to update the trip destination.

Figure 5:
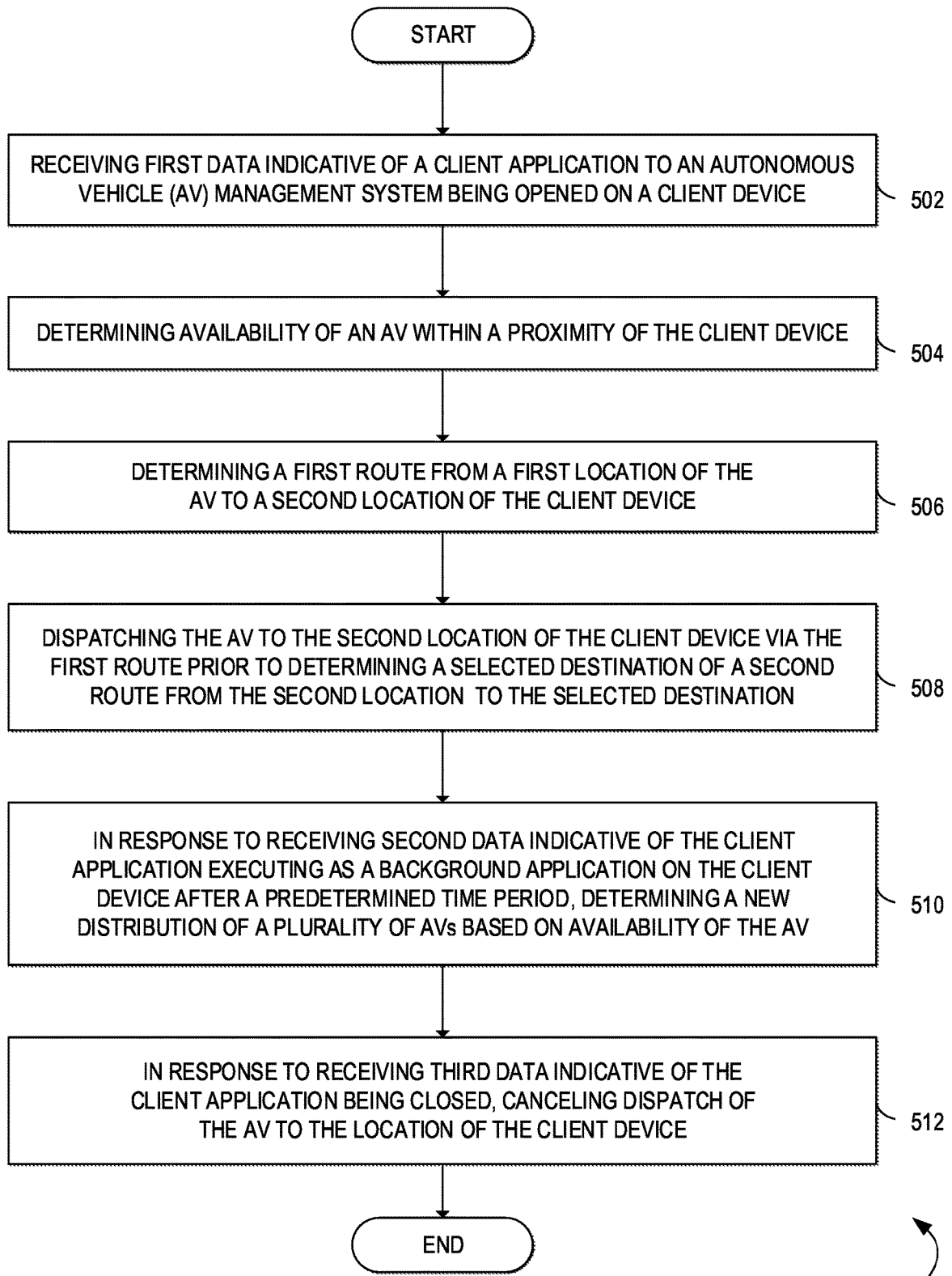
FIG. 5 illustrates a flow chart of an example of a process for improving dispatching of AVs in accordance with an embodiment.

FIG. 5 illustrates a flow diagram of an example of a process 500 for optimizing dispatching of AVs for an AV rideshare (or item delivery) service utilizing an AV fleet management system, such as the AV fleet management system 108. One of ordinary skill will understood that, for any flow, method, or process discussed herein, there can be additional, fewer, or alternative steps performed in similar or alternative orders, or in parallel, within the scope of the various embodiments unless otherwise stated. In some embodiments, the process 500 may be performed by an AV fleet management system. In other embodiments, the process 500 may be performed at least in part by a client device, an AV, or other entity discussed in the present disclosure.

The process 500 can be initiated with step 502 in which the AV fleet management system may receive first data indicative of client software (e.g., a standalone client application or app, a web application accessed through a web browser, an app action or shortcut, a widget, a plug-in, etc.) to the AV fleet management system being opened on a client device (e.g., executing as a foreground thread, process, or application of the client device). For example, the client device can receive a selection (e.g., a click or a tap) of an icon representing the client app, app action or shortcut, widget, plug-in, and so forth. Alternatively or in addition, the client device may receive a Uniform Resource Locator (URL) to the web application (e.g., inputted by text to the browser, selected via a hyperlink, etc.). In some embodiments, the client device may establish a connection (e.g., a WebSocket connection, HTTP connection, etc.) to the AV fleet management system for providing the first data.

The process 500 may then proceed to step 504 in which the AV fleet management system can determine the availability of an AV within a proximity of the client device. This can involve determining a current location of the client device, such as from a GPS, cellular network, a Wi-Fi network, or other source of location data. Determining the availability of the AV can also include identifying a set of AVs currently without passengers (or delivery items) that are most proximate to the client device and that have sufficient resources (e.g., fuel, battery power, tire pressure, etc.) to service a user of the client device. As discussed, conventional rideshare and delivery systems require additional user input, including at least a trip destination, prior to attempting to match a vehicle to the user for a trip. The AV fleet management system can reduce the latency associated with this approach by prefetching an AV immediately upon receiving the first data indicative of the client software being opened on the client device. This can also reduce the number of actions a user must perform to hail an AV.

At step 506, the AV fleet management system can determine a first route from a first location of the AV (e.g., the current location of the AV) to a second location of the client device (e.g., the location determined at step 504 or a designated pick-up location that may be selected by the AV fleet management system or the user). The AV fleet management system can evaluate traffic conditions, estimated times of travel, road conditions, traffic signaling, AV resources, and so forth, to determine the optimal route to the user.

The process 500 can proceed to step 508 in which the AV fleet management system may dispatch or route the AV to the second location of the client device via the first route prior to determining a selected destination of a second route from the second location to the selected destination. In some embodiments, the AV fleet management system may be capable of automatically selecting the destination based on user contextual data, such as saved preferences or pickup and dropoff pairs; location data embedded in an email, calendar entry, or other user content; historical behavior data specific to the user (e.g., the user having weekly piano lessons at a specified location); historical behavior data of a set of users having similarities to the specific user (e.g., college students traveling to a particular bar after the conclusion of a football game), historical behavior data of all users, and so forth.

In some embodiments, the process 500 can also include a step 510 corresponding to the user interaction model 428. The AV fleet management system can receive second data indicative of the client software being executed as a background thread, process, or application of the client device. Upon a predetermined time period elapsing while the client software continuously executes in the background, the AV fleet management system may interpret the second data as user intent that the user does not immediately need servicing by an AV en route to the user. The AV fleet management system may update a state of the AV as available. The AV fleet management system may determine new routes for the AV and determine whether the AV would be a preferred AV or more optimal AV for a second user still waiting for his/her AV (e.g., one or more new metrics for a new route to the second user improves upon one or more corresponding previous metrics of a previous route to the second user). For example, the metrics may be based on a distance between each route, a time to travel for each route, resource utilization between each route (e.g., fuel, battery power, etc.), and so forth. If so, the AV fleet management system may reroute the AV to the second user and dispatch a different available AV for the first user. The predetermined time period may be a static time period (e.g., 5 minutes), a time period corresponding to an Estimated Time of Arrival (ETA) of the AV to the first user (e.g., the initial ETA, the last ETA received by the client device before backgrounding of the client software, an ETA±a static time period, etc.), a time period of inactivity following an alert or notification sent to the client device regarding the AV, a time period derived from a machine learning model based on the user's characteristics, and so forth.

In some embodiments, the process 500 may also include a step 512 corresponding to the user interaction model 430. The AV fleet management system may receive third data indicative of the client software being closed on the client device prior to the AV arriving at the pick-up location. The AV fleet management system may interpret the third data as user intent to cancel the trip. The AV fleet management system may cancel the trip, reset the state of the AV to make it immediately available for other users, and determine new routes for the AV for pending trips to determine whether the AV would be a preferred AV or more optimal AV for another user still waiting for his/her AV (e.g., one or more new metrics for a new route to the second user improves upon one or more corresponding previous metrics of a previous route to the second user). If so, the AV fleet management system may reroute the AV to the second user.

Figure 6:
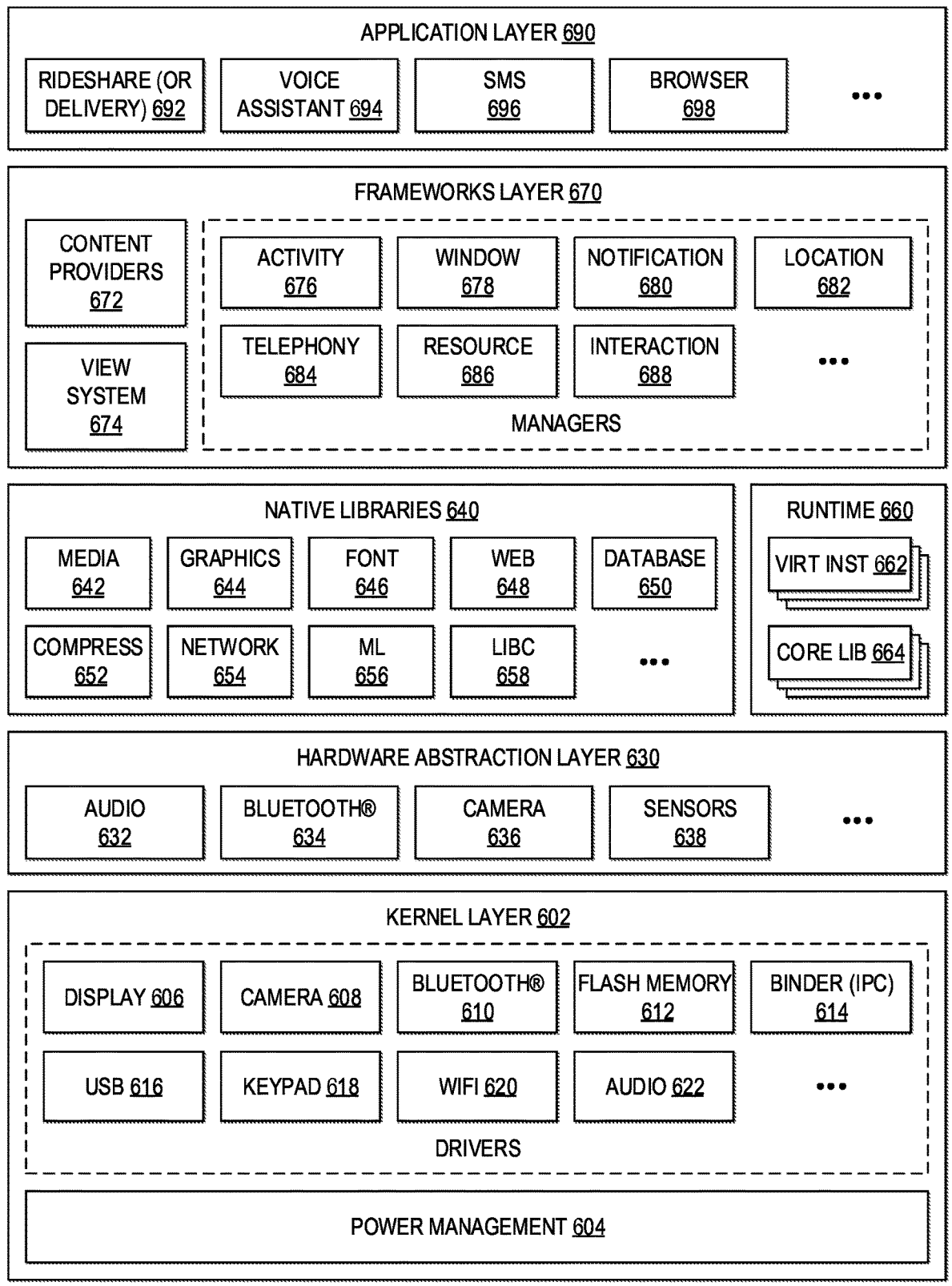
FIG. 6 illustrates a block diagram representing an example of a software architecture for a computing system in accordance with an embodiment.

FIG. 6 illustrates an example of a software architecture 600 for a mobile computing device, such as a tablet computer, a mobile phone, a wearable device (e.g., a smart watch, smart glasses or other head-mounted display (HMD), smart ear pods or other in-ear, on-ear, or over-ear device, etc.), and so forth. Although the software architecture 600 is particularly suitable for a mobile computing device, one of ordinary skill in the art will understand that other embodiments may employ other software architectures suitable for computing devices of other form factors.

The software architecture 600 may be conceptualized as a stack of layers in which each layer provides particular functionality. For example, the software architecture 600 may include layers such as a kernel layer 602, a hardware abstraction layer 630, native libraries 640, a runtime engine 660, a frameworks layer 670, and an applications layer 690.

Operationally, applications of the applications layer 690 and/or other modules/components in the other layers may invoke Application Programming Interface (API) calls through the software stack and receive a response, returned values, and so forth, as messages. The layers illustrated are representative in nature and not all software architectures have all layers. For example, some mobile or special-purpose operating systems may not provide a frameworks layer 670, while others may provide such a layer. Other software architectures may include additional or different layers.

The foundation of the software architecture 600 is the kernel layer 602, which can provide operating system functionalities, such as power management 604, low-level memory management (not shown), process management (e.g., scheduling, threading, etc.) (not shown), networking (not shown), security (not shown), logging (not shown), and so forth. In addition, the kernel layer 602 may include a driver model to enable device manufacturers to develop hardware drivers for a common, well-known kernel. For example, the kernel layer 602 may include one more display drivers 606, camera drivers 608, Bluetooth® drivers 610, Flash memory drivers 612, binder (Inter-Process Communications (IPC) drivers 614, serial communication drivers (e.g., Universal Serial Bus (USB)) 616, keypad drivers 618, Wi-Fi drivers 620, and audio drivers 622, among others, depending on the hardware configuration. In some embodiments, the kernel layer 602 may be based on the open-source Linux® kernel.

The hardware abstraction layer 630 can provide standard interfaces that expose device hardware capabilities to higher-level layers of the software architecture 600, such as the native libraries 640, the runtime engine 660, the frameworks layer 670, and so forth. The hardware abstraction layer 630 can comprise multiple modules, each of which can implement an interface for a specific type of hardware component, such as an audio module 632, a Bluetooth® module 634, a camera module 636, and a sensors module 638, among others. When a component of a higher-level layer makes a call to access device hardware, the module for that hardware can be loaded.

In some embodiments, some of the components of the software architecture 600, such as the hardware abstraction layer 630 and the runtime engine 660, may be built from code that require native libraries written in a programming language, such as C and C++. Higher-level layers, such as the frameworks layer 670, may expose the functionality of some of these native libraries to applications of the applications layer 690. In this example, the native libraries may include one or more media framework libraries 642 (e.g., Native Media Application Programming Interfaces (APIs) and/or other libraries to support presentation and manipulation of various media formats, such as Moving Picture Experts Group (MPEG) 4 (MPEG-4 or MP4), H.264, MPEG 3 (MP3), Advanced Audio Coding (AAC), Adaptive Multi-Rate (AMR), Joint Photographic Experts Group (JPEG or JPG), Portable Network Graphics (PNG), etc.), graphics rendering libraries 654 (e.g., Open Graphics Library (OpenGL®), Scalable Graphics Library (SGL), etc.), font rendering libraries 656 (e.g., FreeType), webpage rendering libraries 658 (e.g., WebKit), database management libraries 650 (e.g., Structured Query Language), data compression libraries 652 (e.g., zlib), networking libraries (e.g., Secure Sockets Layer (SSL), Native Multinetwork APIs, etc.), machine learning libraries (e.g., Neural Networks API), and libc (e.g., C standard library for providing memory allocation functions, string manipulation functions, mathematic functions, etc.). The native libraries 650 may also include a wide variety of other libraries to provide other native APIs to the elements of the frameworks layer 670, applications layer 690, and other software components/modules.

In some embodiments, each application executing in the software architecture 600 can run in its own process within its own virtual instance 662 (e.g., virtual machine, container, etc.) of the runtime engine 660. The runtime engine 660 may run multiple virtual instances by executing byte code files, such as Dalvik Executable (DEX) files or other format designed for mobile computing devices (e.g., optimized for minimal memory utilization). Some of the features of the runtime engine 660 can include ahead-of-time and just-in-time compilation, optimized garbage collection, conversion of byte code into more compact machine code, and advanced debugging support (e.g., dedicated sampling profiler, detailed diagnostic exceptions and crash reporting, watchpoints for monitoring specific fields, etc.). The runtime engine 660 can also include core libraries 664 for providing interoperability between a particular programming language and the virtual instance 662, and expose the core APIs for that programming language, including data structures, utilities, file access, network access, and graphics, among others.

The frameworks layer 670 can comprise a set of services through which applications of the applications layer 690 interact. These services can manage the basic functions of a mobile computing device, such as resource management, voice call management, and data sharing, among others. In this example, the frameworks layer includes content providers 672, a view system 674, and a number of managers. The content providers 672 can enable applications to access data from other applications, such as a contacts application (not shown) or a calendar application (not shown), and to share their own data. The view system 674 can be used to build an application's user interface, including lists, grids, text boxes, buttons, an embeddable web browser, and so forth. The managers can include an activity manager 676, a window manager 678, a notification manager 680, a location manager 682, a telephony manager 684, a resource manager 686, and an interaction manager 688. The activity manager 676 can control the activity life cycle of applications and can provide a common navigation back stack. The window manager 678 can be responsible for organizing contents of a display screen of a mobile computing device. The notification manager 680 can allow applications to display customs alerts and notifications. The location manager 682 can provide for location services, such as determining the location of a mobile computing device by a Global Positioning System (GPS), a cellular network, a Wi-Fi network, or other location system. The telephony manager 684 can be responsible for voice calls. The resource manager 686 can provides access to various types of non-code resources, such as localized strings, graphics, user interface layouts, and so forth. The interaction manager 688 can be responsible for user intent models, such as the user interactions models 420.

The frameworks layer 670 can also include various hardware device managers not shown in the software architecture 600, such as one or more camera managers, Bluetooth® managers, Wi-Fi managers, USB managers, and sensor managers (e.g., gyroscopes, accelerometers, magnetometers, proximity sensors, temperature sensors, light sensors, pressure sensors, humidity sensors, etc.), among others.

Located at the top of the software architecture 600 is the applications layer 690, which can comprise various applications, such as a rideshare application 692, a voice assistant application 694, a Short Messaging Service (SMS) application 696, a web browser 698, and so forth.

Figure 7A:
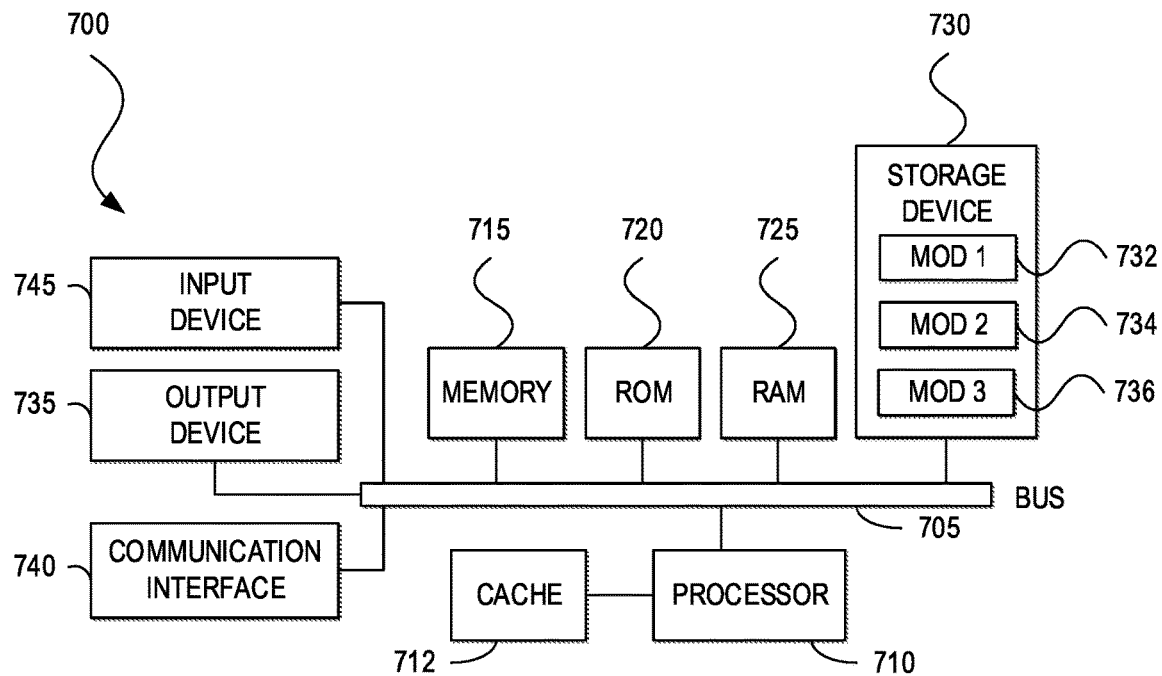
FIGS. 7A and 7B illustrate block diagrams representing examples of computing systems in accordance with some embodiments.
Figure 7B:
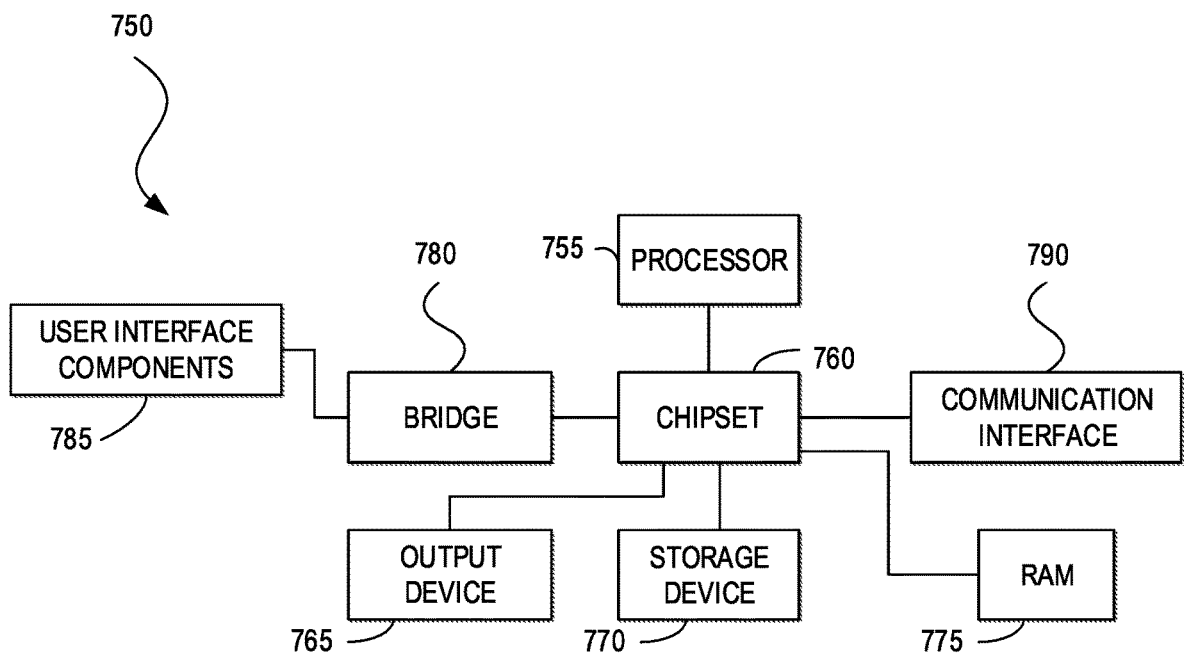

FIG. 7A and FIG. 7B illustrate systems in accordance with various embodiments. The more appropriate system will be apparent to those of ordinary skill in the art when practicing the various embodiments. Persons of ordinary skill in the art will also readily appreciate that other systems are possible.

FIG. 7A illustrates an example of a bus computing system 700 wherein the components of the system are in electrical communication with each other using a bus 705. The computing system 700 can include a processing unit (CPU or processor) 710 and a system bus 705 that may couple various system components including the system memory 715, such as read only memory (ROM) 720 and random access memory (RAM) 725, to the processor 710. The computing system 700 can include a cache 712 of high-speed memory connected directly with, in close proximity to, or integrated as part of the processor 710. The computing system 700 can copy data from the memory 715, ROM 720, RAM 725, and/or storage device 730 to the cache 712 for quick access by the processor 710. In this way, the cache 712 can provide a performance boost that avoids processor delays while waiting for data. These and other modules can control the processor 710 to perform various actions. Other system memory 715 may be available for use as well. The memory 715 can include multiple different types of memory with different performance characteristics. The processor 710 can include any general purpose processor and a hardware module or software module, such as module 1 732, module 2 734, and module 3 736 stored in the storage device 730, configured to control the processor 710 as well as a special-purpose processor where software instructions are incorporated into the actual processor design. The processor 710 may essentially be a completely self-contained computing system, containing multiple cores or processors, a bus, memory controller, cache, etc. A multi-core processor may be symmetric or asymmetric.

To enable user interaction with the computing system 700, an input device 745 can represent any number of input mechanisms, such as a microphone for speech, a touch-protected screen for gesture or graphical input, keyboard, mouse, motion input, speech and so forth. An output device 735 can also be one or more of a number of output mechanisms known to those of skill in the art. In some instances, multimodal systems can enable a user to provide multiple types of input to communicate with the computing system 700. The communications interface 740 can govern and manage the user input and system output. There may be no restriction on operating on any particular hardware arrangement and therefore the basic features here may easily be substituted for improved hardware or firmware arrangements as they are developed.

The storage device 730 can be a non-volatile memory and can be a hard disk or other types of computer readable media which can store data that are accessible by a computer, such as magnetic cassettes, flash memory cards, solid state memory devices, digital versatile disks, cartridges, random access memory, read only memory, and hybrids thereof.

As discussed above, the storage device 730 can include the software modules 732, 734, 736 for controlling the processor 710. Other hardware or software modules are contemplated. The storage device 730 can be connected to the system bus 705. In some embodiments, a hardware module that performs a particular function can include a software component stored in a computer-readable medium in connection with the necessary hardware components, such as the processor 710, bus 705, output device 735, and so forth, to carry out the function.

FIG. 7B illustrates an example architecture for a chipset computing system 750 that can be used in accordance with an embodiment. The computing system 750 can include a processor 755, representative of any number of physically and/or logically distinct resources capable of executing software, firmware, and hardware configured to perform identified computations. The processor 755 can communicate with a chipset 760 that can control input to and output from the processor 755. In this example, the chipset 760 can output information to an output device 765, such as a display, and can read and write information to storage device 770, which can include magnetic media, solid state media, and other suitable storage media. The chipset 760 can also read data from and write data to RAM 775. A bridge 780 for interfacing with a variety of user interface components 785 can be provided for interfacing with the chipset 760. The user interface components 785 can include a keyboard, a microphone, touch detection and processing circuitry, a pointing device, such as a mouse, and so on. Inputs to the computing system 750 can come from any of a variety of sources, machine generated and/or human generated.

The chipset 760 can also interface with one or more communication interfaces 790 that can have different physical interfaces. The communication interfaces 790 can include interfaces for wired and wireless LANs, for broadband wireless networks, as well as personal area networks. Some applications of the methods for generating, displaying, and using the technology disclosed herein can include receiving ordered datasets over the physical interface or be generated by the machine itself by the processor 755 analyzing data stored in the storage device 770 or the RAM 775. Further, the computing system 750 can receive inputs from a user via the user interface components 785 and execute appropriate functions, such as browsing functions by interpreting these inputs using the processor 755.

It will be appreciated that computing systems 700 and 750 can have more than one processor 710 and 755, respectively, or be part of a group or cluster of computing devices networked together to provide greater processing capability.

For clarity of explanation, in some instances the various embodiments may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Some examples of such form factors include general purpose computing devices such as servers, rack mount devices, desktop computers, laptop computers, and so on, or general purpose mobile computing devices, such as tablet computers, smart phones, personal digital assistants, wearable devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A computer-implemented method comprising:
   receiving, by an AV fleet management system, first data indicating that a client application is open on a first client device of a first user and a location of the first client device operating the client application;
   prior to an explicit request for a ride by an AV via the client application and in response to the first data indicating that the client application is open on the first client device, dispatching, by the AV fleet management system, a first AV to the location of the first client device and updating a state of the first AV to indicate that the first AV is pending when the first AV has been dispatched to the location of the first client device;
   receiving, by the AV fleet management system, second data from the first client device,
   wherein when the second data is indicative of the client application being closed, canceling the dispatch of the first AV to the location of the first client device; and
   wherein when the second data is indicative of the client application executing as a background application, updating a state of the first AV to indicate availability of the AV while the first AV continues to the location and selectively rerouting, by the AV fleet management system, the first AV to another location based on need of the first AV by a second user of a second client device.

2. The computer-implemented method of claim 1, further comprising:
   determining a destination based on contextual data associated with the first user of the first client device.

3. The computer-implemented method of claim 1, further comprising:
   after the dispatching the first AV to the location of the first client device, causing one or more graphical elements indicative of the first AV being a selected AV from among a plurality of AVs to be presented in the client application;
   receiving a selection of a second AV from among the plurality of AVs;
   dispatching the second AV to the location of the first client device; and
   updating a state of the first AV to indicate availability of the AV.

4. The computer-implemented method of claim 1, further comprising:
   after the dispatching the first AV to the location of the first client device, cause one or more graphical elements indicative of the first AV being a selected AV from among a plurality of AVs to be presented in the client application;
   receiving a request for additional information for a second AV from among the plurality of AVs; and
   causing one or more attributes distinguishing the second AV from the first AV to be presented in the client application.

5. The computer-implemented method of claim 1, further comprising:
   causing a notification to be presented by the client application on the first client device, the notification prompting the first user of the first client device to confirm whether the user would like to be serviced by the first AV.

6. A system, comprising:
   one or more processors; and
   memory including instructions that, when executed by the one or more processors, cause the system to:
   receive, by an AV fleet management system, first data indicating that a client application is open on a first client device of a first user and a location of the first client device operating the client application;
   prior to an explicit request for a ride by an AV via the client application and in response to the first data indicating that the client application is open on the first client device, dispatch, by the AV fleet management system, a first AV to the location of the first client device and updating a state of the first AV to indicate that the first AV is pending when the first AV has been dispatched to the location of the first client device;
   receive, by the AV fleet management system, second data from the first client device, wherein when the second data is indicative of the client application being closed, canceling the dispatch of the first AV to the location of the first client device; and
   wherein when the second data is indicative of the client application executing as a background application, updating a state of the first AV to indicate availability of the AV while the first AV continues to the location and selectively rerouting, by the AV fleet management system, the first AV to another location based on need of the first AV by a second user of a second client device.

7. The system of claim 6, wherein the instructions, when executed, further cause the system to:
   determine a destination based on contextual data associated with the first user of the first client device.

8. The system of claim 6, wherein the instructions, when executed, further cause the system to:

after the dispatching the first AV to the location of the first client device, display one or more graphical elements indicative of the first AV being a selected AV from among a plurality of AVs in the client application;
receive a selection of a second AV from among the plurality of AVs;
dispatch the second AV to the location of the first client device; and
update a state of the first AV to indicate availability of the AV.

9. The system of claim 6, wherein the instructions, when executed, further cause the system to:
after the dispatching the first AV to the location of the first client device, display one or more graphical elements indicative of the first AV being a selected AV from among a plurality of AVs in the client application;
receive a request for additional information for a second AV from among the plurality of AVs; and
present one or more attributes distinguishing the second AV from the first AV.

10. The system of claim 6, wherein the instructions, when executed, further cause the system to:
cause a notification to be presented by the client application on the first client device, the notification prompting the first user of the first client device to confirm whether the user would like to be serviced by the first AV.

11. A non-transitory computer-readable storage medium comprising instructions that, upon being executed by one or more processors of a system, cause the system to:
receive, by an AV fleet management system, first data indicating that a client application is open on a first client device of a first user and a location of the first client device operating the client application;
prior to an explicit request for a ride by an AV via the client application and in response to the first data indicating that the client application is open on the first client device, dispatch, by the AV fleet management system, a first AV to the location of the first client device and updating a state of the first AV to indicate that the first AV is pending when the first AV has been dispatched to the location of the first client device;
receive, by the AV fleet management system, second data from the first client device, wherein when the second data is indicative of the client application being closed, canceling the dispatch of the first AV to the location of the first client device; and
wherein when the second data is indicative of the client application executing as a background application, updating a state of the first AV to indicate availability of the AV while the first AV continues to the location and selectively rerouting, by the AV fleet management system, the first AV to another location based on need of the first AV by a second user of a second client device.

12. The non-transitory computer-readable storage medium of claim 11, wherein the instructions, when executed, further cause the system to:
determine a destination based on contextual data associated with the first user of the first client device.

13. The non-transitory computer-readable storage medium of claim 11, wherein the instructions, when executed, further cause the system to:
after the dispatching the first AV to the location of the first client device, display one or more graphical elements indicative of the first AV being a selected AV from among a plurality of AVs in the client application;
receive a selection of a second AV from among the plurality of AVs;
dispatch the second AV to the location of the first client device; and
update a state of the first AV to indicate availability of the AV.

14. The non-transitory computer-readable storage medium of claim 11, wherein the instructions, when executed, further cause the system to:
after the dispatching the first AV to the location of the first client device, display one or more graphical elements indicative of the first AV being a selected AV from among a plurality of AVs in the client application;
receive a request for additional information for a second AV from among the plurality of AVs; and
present one or more attributes distinguishing the second AV from the first AV.

15. The non-transitory computer-readable storage medium of claim 11, wherein the instructions, when executed, further cause the system to:
cause a notification to be presented by the client application on the first client device, the notification prompting the first user of the first client device to confirm whether the user would like to be serviced by the first AV.

* * * * *